US011864550B2

(12) United States Patent
Webert

(10) Patent No.: US 11,864,550 B2
(45) Date of Patent: Jan. 9, 2024

(54) INSECT CAPTURING DEVICE METHOD FOR CAPTURING INSECTS AND USE OF THE INSECT CAPTURING DEVICE

(71) Applicant: Thomas Webert, Frammersbach (DE)

(72) Inventor: Thomas Webert, Frammersbach (DE)

(*) Notice: Subject to any disclaimer, the term of this patent is extended or adjusted under 35 U.S.C. 154(b) by 0 days.

(21) Appl. No.: 17/284,358

(22) PCT Filed: Oct. 11, 2019

(86) PCT No.: PCT/EP2019/077667
§ 371 (c)(1),
(2) Date: Apr. 9, 2021

(87) PCT Pub. No.: WO2020/074736
PCT Pub. Date: Apr. 16, 2020

(65) Prior Publication Data
US 2021/0345594 A1  Nov. 11, 2021

(30) Foreign Application Priority Data
Oct. 12, 2018  (DE) ...................... 10 2018 125 320.6

(51) Int. Cl.
*A01M 3/00*  (2006.01)
(52) U.S. Cl.
CPC ....... *A01M 3/005* (2013.01); *A01M 2200/012* (2013.01)
(58) Field of Classification Search
CPC .... A01M 1/06; A01M 1/08; A01M 2200/012; F21V 23/0464; G01J 1/10
USPC .................................. 43/110, 111, 138–140
See application file for complete search history.

(56) References Cited

U.S. PATENT DOCUMENTS

| 1,158,542 | A | * | 11/1915 | Noonan | .................. | A01M 5/08 43/139 |
| 2,778,150 | A | * | 1/1957 | Pohlman | ................. | A01M 1/08 43/138 |
| 2,893,161 | A | * | 7/1959 | Reid | ....................... | A01M 1/08 43/139 |
| 3,965,608 | A | * | 6/1976 | Schuman | .............. | A01M 3/005 15/341 |

(Continued)

FOREIGN PATENT DOCUMENTS

| CN | 201563518 U | 9/2010 |
| DE | 123396 U | 4/1900 |

(Continued)

OTHER PUBLICATIONS

Turpin, Tom. "Insects See the Light," Purdue University (Year: 2012).*

(Continued)

*Primary Examiner* — Peter M Poon
*Assistant Examiner* — Morgan T Jordan
(74) *Attorney, Agent, or Firm* — Grossman, Tucker, Perreault & Pfleger PLLC; Steven J. Grossman

(57) ABSTRACT

An active insert capturing device having a capturing opening with an opening edge, a receiving chamber having a chamber wall, at least one glare light source, an insect trap in the form of a suction device, the insect device including at least one carrying handle and is portable. The insect capturing device can be configured as a removable vacuum cleaner attachment.

14 Claims, 3 Drawing Sheets

(56) References Cited

U.S. PATENT DOCUMENTS

| | | | | |
|---|---|---|---|---|
| 4,132,027 A * | 1/1979 | Malacheski | A01M 3/00 | 43/134 |
| 4,449,319 A * | 5/1984 | Garcia | A01M 3/005 | 43/139 |
| 5,870,851 A * | 2/1999 | Shoemaker | A01M 1/14 | 119/626 |
| 6,651,380 B2 * | 11/2003 | Wyers | A01M 5/08 | 43/139 |
| 8,109,036 B1 * | 2/2012 | Wilbanks | A01M 1/223 | 43/112 |
| 8,141,291 B2 * | 3/2012 | Schinazi | A01M 1/023 | 43/138 |
| 8,240,082 B1 * | 8/2012 | Fall | A01M 1/08 | 43/138 |
| 8,276,313 B2 * | 10/2012 | Reime | A01M 3/00 | 43/134 |
| 2002/0038488 A1 * | 4/2002 | Paterson | A47L 9/0673 | 15/324 |
| 2004/0068917 A1 * | 4/2004 | Chan | A01M 1/08 | 43/113 |
| 2005/0246944 A1 * | 11/2005 | Flowers | A01M 3/005 | 43/112 |
| 2005/0246945 A1 * | 11/2005 | Evink | A01M 3/005 | 43/139 |
| 2007/0039234 A1 * | 2/2007 | Reime | A01M 3/00 | 43/134 |
| 2007/0169403 A1 * | 7/2007 | Collins | A01M 3/005 | 43/139 |
| 2007/0240275 A1 * | 10/2007 | Willenbring | A47L 9/30 | 15/324 |
| 2010/0287816 A1 | 11/2010 | Abelbeck | | |
| 2012/0036675 A1 * | 2/2012 | Conrad | B01D 45/12 | 15/347 |
| 2012/0137569 A1 * | 6/2012 | Younts | A01M 3/005 | 43/139 |
| 2013/0298444 A1 * | 11/2013 | Strube | A01M 1/106 | 43/107 |
| 2014/0013655 A1 * | 1/2014 | Southard | A01M 1/2094 | 43/139 |
| 2016/0245916 A1 * | 8/2016 | Weber-Grabau | | H01J 37/32917 |

FOREIGN PATENT DOCUMENTS

| | | | | |
|---|---|---|---|---|
| DE | 155600 U | | 9/1903 | |
| DE | 161732 C | | 9/1904 | |
| DE | 270634 U | | 12/1912 | |
| DE | 273005 U | | 6/1913 | |
| DE | 1294041 U | | 4/1969 | |
| DE | 1413679 U | | 4/1969 | |
| DE | 2834972 U | | 2/1980 | |
| DE | 7140295 U | | 2/1980 | |
| DE | 4327150 A1 * | | 2/1995 | A01M 1/06 |
| DE | 102009025526 A1 * | | 12/2010 | A01M 3/005 |
| DE | 102016124986 A1 * | | 6/2018 | A01M 3/005 |
| GB | 2482406 A * | | 2/2012 | A01M 3/005 |
| KR | 102238955 B1 * | | 1/2009 | A01M 1/06 |
| WO | 2005032248 A1 | | 4/2005 | |

OTHER PUBLICATIONS

International Search Report dated Jan. 8, 2020 related to corresponding application No. PCT/EP2019/077667.

* cited by examiner

INSECT CAPTURING DEVICE METHOD FOR CAPTURING INSECTS AND USE OF THE INSECT CAPTURING DEVICE

The present invention relates to active insect capturing devices with which insects can be removed from a surface. The invention also relates to a method for capturing insects.

Furthermore, the invention further relates to the use of the active insect capturing device for actively capturing insects.

Insect capturing devices are known from the prior art.

DE 123396 U from the year 1900 discloses a fly catcher in which flies are lured into a container by a light burning therein, where they are burned.

DE 155600 U from the year 1903 discloses a device for capturing insects in which use is made of a light source for luring and sticky capturing surfaces for trapping.

DE 270634 U from the year 1912 discloses a device for capturing and destroying insects by means of vacuum action.

DE 273005 U from the year 1913 discloses a self-luminous fly catcher.

DE 1294041 U from the year 1934 discloses a mechanical apparatus for capturing insects by means of suction air.

The combination of a light and a fan is also not entirely unknown.

DE 1413679 U from the year 1937 discloses a light bulb toward which mosquitos fly and are sucked away by a suction fan.

DE 7140295 U from the year 1971 discloses a device for removing insects, wherein a light source, which lures the insects into the air stream of the fan, is arranged on the ventilation system. According to the description, insects are attracted by the light source.

DE 2834972 U from the year from the year 1978 discloses a device for capturing flies, in which a vase comprises a scent trap container and a suction fan. Although mention is made of a light source, the function is not described in any further detail.

It is sufficiently known from the prior art that there are insects that are attracted to light. Accordingly, light is supposedly the attractant. Meanwhile, more recent biological studies hypothesize that some insects are attracted by heat rather than by light, thus rendering the suitability of some insect capturing devices questionable for certain insects. For example, mosquitos are nocturnal and typically only fly to light sources if another attractant is present. The devices, methods and techniques mentioned in the aforementioned prior art relate mostly to passive capturing devices, i.e., the capturing devices are designed for continuous operation and are intended to attract and then trap or destroy insects. Heat, odors, light (for moths) and/or colors are used for attraction. This attraction can only function if the insect is not agitated or frightened away. For trapping insects with such passive capturing devices, one must also depend on the cooperation of the insects. In order to get into the capturing device, the insects must actively move into said capturing device themselves. Actively catching an insect with a pheromone-coated sticky strip would be as least as hard as swatting one with an ordinary magazine. Passive capturing devices and methods are therefore designed to lie in wait (passively) for hours or even days and are generally not suitable for use as a means for actively capturing insects.

Active insect capturing devices in the form of a fly swatter or a butterfly net, for example, are likewise sufficiently known.

For example, DE 161732 from the year 1904 discloses a device for catching and killing insects, which is slowly moved toward the insect. For this purpose, the container is designed as partially transparent and filled with liquid. However, in this example as well there is still a considerable risk of the insect flying away.

In addition, active insect capturing devices usually demand a not inconsiderable level of speed and dexterity. When the capturing device is set on a surface on which the insect is located, the surface is often soiled if the insect is killed. Provision is often not made for live catching.

The object of the present invention is to overcome the disadvantages of the prior art and provide an improved active capturing device with which it is possible to actively snatch insects from a surface without them flying away and in particular also without having to set the capturing device on the surface.

The object is achieved by an active insect capturing device comprising a capture opening having an opening edge, at least one glare light source and an insect trap, and preferably at least one receiving chamber having at least one chamber wall, wherein the active insect capturing device comprises at least one carrying handle and is portable.

In the sense of the present invention, active insect capturing device means that an active movement of the insect into the capturing device is not required, but that the user of the capturing device can actively trap the insect. In other words, the user can trap or pursue an insect, in particular an insect resting on a surface, with the insect capturing device according to the invention.

Surprisingly, it was shown that a slow approach to the insects while using at least one glare light source is possible. Typically, an attempt is made to approach insects either by being very quick (e.g., the principle of a fly swatter) and/or by the trap container being as inconspicuous as possible (e.g., transparent water glass) so as to facilitate an unnoticed approach due to the sometimes-poor eyesight of insects. However, in the present case it was confirmed that when an insect, for example in the case of blow flies, house flies and fruit flies, is directly irradiated and blinded with a glare light source, it surprisingly does not move away at the approach of a suitable object. This cannot be called an unnoticed approach, at least not from a human perspective. Although it is hardly possible to conceive of anything more conspicuous than a light source, apparently the insects do not feel sufficiently threatened to react to it. Without being bound to a single theory, the hypothesis is that numerous insects are more strongly conditioned evolutionarily to shadows rather than to movements. In principle, the flight reflex in the case of a fly swatter could obviously also be attributable to a sensitivity to movements.

However, in view of the successful blinding effect, in retrospect it is hypothesized these insects react more strongly to shadows than to movements. Artificial light sources do not exist in nature and with the exception of heavenly bodies, natural light sources are very rare. Also, said heavenly bodies (e.g., the sun) are generally not a threat, but instead indicate that the sky is free and that, for example, there are not any birds above the insect. The at least one glare light source of the present invention is therefore not perceived as threatening, but nevertheless blinds the insect so that the insect capturing device and the capture opening can be moved close enough to the insect so that it can be caught, for example aspirated, by the insect trap.

The object is also achieved by an active insect capturing device comprising a capture opening having an opening edge, at least one glare light source and preferably at least one receiving chamber having at least one chamber wall, wherein the active insect capturing device is an in particular removable vacuum cleaner attachment suitable for a vacuum cleaner and having a carrying handle.

The basic principle is identical to the proposed solution initially described. However, in this further solution the insect trap, i.e., the element that receives, holds, kills and/or renders the insect harmless in any other way, is a vacuum cleaner having a carrying handle. It can be a standard floor vacuum cleaner, which in particular is designed to be connected to the power grid for operation, or a portable, in particular rechargeable battery-powered hand vacuum cleaner. The standard floor vacuum cleaner typically has a suction hose, at the end of which the vacuum cleaner attachments are interchangeable. The vacuum cleaner attachment according to the invention is preferably intended for such a suction hose. However, interchangeable vacuum cleaner attachments for hand vacuum cleaners are also well-known and in an alternative embodiment, the vacuum cleaner attachment according to the invention is adapted and arranged for such a vacuum cleaner. In the sense of the present invention, a vacuum cleaner includes any apparatus with which air can be suctioned through a tube or the like; for example, a floor vacuum cleaner or, in a preferred embodiment, portable vacuum cleaners such as car vacuum cleaners or dust busters. In principle, many diverse embodiments come into consideration for this purpose, for example rechargeable battery-operated vacuum cleaners, bagless vacuum cleaners, industrial vacuum cleaners or cyclone vacuum cleaners. It is also possible to use other types of suction devices for the insect capturing device according to the invention such as window vacuums, wet or water vacuums, ash vacuums or leaf vacuums. These devices also represent vacuum cleaners of the present invention.

An "active" insect capturing device in the sense of the invention must be distinguished from a "passive" insect capturing device. With an active insect capturing device, the insect is actively pursued when the insect capturing device is used as intended, i.e., the active insect capturing device, when used as intended, is guided to the insect. A fly swatter is an example of such an active insect capturing device. In contrast, a passive insect capturing device attracts insects, i.e., with intended use the insects are attracted to the insect capturing device while the insect capturing device is passively, usually stationarily, "lying in wait". Such insect capturing devices of the prior art have been described above. An active insect capturing device is adapted and arranged for such an active use and usually only needs electrical energy for only a very limited time of a few minutes or seconds in order to successfully catch and/or kill an insect, wherein there are also non-power-consuming active insect capturing devices (fly swatters). Accordingly, an active insect capturing device is preferably designed for short-time operation, i.e., swatting with a fly swatter or the insect is blinded by the glare and then actively picked up by the user. The pick-up can also be automatic, for example by means of a suction device. Passive insect capturing devices must be suitable for continuous operation, since it takes considerable time until insects are attracted. For example, there are passive insect capturing devices which continuously emit carbon dioxide and other attractants in order to trap and destroy thousands of mosquitos. The present invention relates to active insect capturing devices.

In the sense of the invention, "in front of" or "in front of the capture opening" designates the direction starting from the capture opening in which most of the remaining part of the insect capturing device does not extend. Accordingly, it is the direction in which the insect is to be encountered as the capture opening is moved toward the insect. In the sense of the invention, "in back of" or "behind the capture opening" designates the direction in which the receiving chamber lies. If an insect moves from a position in front of the capture opening to a position in back of the capture opening, it passes into the insect capturing device, in particular into the receiving chamber, and eventually ends up in the insect trap. If an insect moves from a position behind the capture opening to a position in front of the capture opening, it passes out of the receiving chamber and can, for example, be released.

In the sense of the present invention, the "blinding cone" is a preferably essentially cone-shaped area which is illuminated by the glare light source. This preferably cone-shaped area is illuminated directly by the glare light source and not, say, indirectly by refraction, scattering or reflection of light of the glare light source. The glare light source is preferably a spotlight or another light source with a directed beam. If multiple glare light sources are present, each of the glare light sources forms an individual blinding light cone and the sum of these individual blinding light cones is considered "blinding cone" in the sense of the present invention. Provision is preferably made such that the at least one glare light source forms a blinding cone in an area predominantly in front of the capture opening.

In the sense of the present invention, an insect capturing device is "portable" if it can be carried by a person and is preferably adapted and arranged to be carried by a person, in particular at the at least one carrying handle. In some embodiments, the insect capturing device weighs less than 10 kg, preferably less than 5 kg, in particular less than 4 kg, very particularly preferably less than 2 kg. In some embodiments, the insect capturing device weighs 100 g to 2000 g, in particular 200 g to 1700 g, particularly preferably 400 g to 1500 g.

If a zone, area or insect is "directly" illuminated, it means that light of the light source is incident, at least partially and without detours, on said zone, said area or said insect, preferably that at least some of the photons, in particular at least 25% and/or at least 50% of the photons emitted by the light source, reach said zone, area or insect on a linear path from the light source. In contrast, an indirect illumination can occur if light of the light source must first be scattered, reflected or refracted in order to fall on a zone, area or insect. For example, a light source behind a corner can indirectly illuminate an area in front of the corner. The refraction is due to the wave properties. The principle is known, for example, from buildings in which the windows are lighted even though the light sources are not visible. If a zone, area or insect is "directly" illuminated, this can also be referred to as "direct" illumination of the zone, area or insect with the light source. Light which falls directly on an object from a light source is often better suited for achieving a maximum blinding effect. For example, one can be blinded by the sun if it shines directly in one's eyes (although in principle, blinding can also occur due to reflections, which often requires a stronger light source).

The insect capturing device preferably comprises a receiving chamber. In principle, it is also conceivable to provide a capture opening, which is closed by a grid, the grid being electrically charged. The insects die upon contact. In this case, for example, a receiving chamber is not mandatory. However, a receiving chamber has been proven to be expedient. Said receiving chamber preferably comprises an in particular cylindrical interior. The interior can be designed as oblong; in particular it can be a tunnel-like interior.

In some embodiments, the at least one chamber wall forms said receiving chamber in the form of a receiving tube, in particular wherein the at least one chamber wall/the receiving tube has, at least in regions, a cross section, preferably an oval, round or polygonal, in particular rectangular cross section. The cross section in some embodiments preferably has a constant cross section geometry and/or constant cross section dimensions and/or a constant cross section contour at least partially along the receiving chamber, in particular along the longitudinal extension of the receiving tube. Preferably, provision is made such that the at least one chamber wall forms a receiving tube and the capture opening is formed on an end of the receiving tube. It is also preferable if the receiving tube is rigid. Although bendable and/or flexible receiving tubes are suitable, it has been proven to be particularly advantageous to use rigid receiving tubes which cannot be bent in a non-destructive manner, for example receiving tubes made of a brittle, transparent hard plastic. The receiving chamber is preferably designed as a receiving tube having a tunnel-like interior. It is also preferable if the mean diameter of the receiving tube is smaller than the length of the receiving tube by a factor of at least 3, in particular at least 5, preferably at least 10. The receiving tube preferably has a mean inner and/or outer diameter of less than 10 cm, in particular of less than 7 cm, preferably of less than 4 cm. In a particularly expedient embodiment of the active insect capturing device according to the invention, the diameter of the capture opening or the opening edge of the capture opening or the receiving chamber, in particular the receiving tube, can be adapted to the volume flow. In the event of weak performance of the vacuum cleaner being used, in other words a smaller volume flow, it is advantageous to have a smaller diameter of the receiving chamber, in particular of the receiving tube, whereas in the event of high performance of the vacuum cleaner being used, then a larger diameter of the receiving tube can be set. In an expedient embodiment of the active insect capturing device according to the invention, in particular as a vacuum cleaner attachment, the diameter of the receiving chamber, in particular of the receiving tube, is variably adjustable such that the attachment can be mounted on all types of vacuum cleaners, regardless of their performance.

The embodiment as a receiving tube makes it possible in a particularly efficient manner to approach the insect. The user and the user's hand remain at a distance, whereas the tip of the receiving tube is rendered almost "invisible" by the glare light of the glare light source. It is more efficient if said glare light does not have to render the user's hand "invisible" as well by blinding.

In one embodiment, the at least one glare light source is situated in the receiving chamber, in particular in the form of a receiving tube, of the insect capturing device and preferably shines out through the capture opening. It is also preferable if the rest of the insect capturing device is situated behind the capture opening and if the insect can be situated in front of the capture opening before being caught, wherein the at least one glare light source is situated behind the capture opening and shines out through the capture opening. This ensures a particularly good blinding effect. The insect is irradiated directly by the at least one glare light source. Preferably, provision is made such that the glare light source shines directly through the capture opening and/or is located behind the capture opening. A direct shining-through means that light passes directly through the capture opening.

In one embodiment, the insect trap is a live-catch trap, i.e., for the most part, insects are caught alive. In another embodiment, the trap is one which for the most part kills insects.

Preferably, provision is made such that the at least one glare light source is adapted and arranged for directly irradiating a zone in front of the capture opening. The glare light source can comprise reflectors for focusing the light in this direction. The basic principle is known from flashlights and car headlights. In some embodiments, provision is made such that the blinding cone has a mean diameter 1 cm and/or 3 cm and/or 5 cm in front of the capture opening that is larger than the capture opening. In preferred embodiments, the mean diameter of the blinding cone is smaller than the diameter of the capture opening as it passes through the capture opening and particularly preferably also at a distance from the capture opening, for example 1 cm and/or 3 cm and/or 5 cm in front of the capture opening, in particular until the light beam impinges upon the insect or the eye region of the insect. In many cases it is sufficient if the head of the insect is illuminated such that the blinding effect only manifests itself around the eye region of the insects. Accordingly, the diameter of the glare cone can also be so small that it corresponds to the diameter of the insect, in particular to the diameter of the insect head. It is thus possible to ensure that the insect does not perceive the opening edge.

Preferably, provision is made such that the at least one chamber wall is, at least in regions, transparent and/or translucent, preferably wherein the capture opening is delimited, at least in regions, by the surrounding transparent and/or translucent at least one chamber wall. The opening edge of the capture opening is preferably transparent and/or translucent, at least in regions, in particular entirely transparent and/or translucent.

The receiving chamber, in particular the receiving tube, is preferably formed from a transparent and/or translucent material. The receiving chamber can be formed comprising a transparent and/or translucent plastic, for example.

The at least one carrying handle is preferably located beyond the receiving chamber, in particular beyond the receiving chamber and on a side of the receiving chamber opposite the capture opening. It has been shown that the described position of the carrying handle there particularly effectively prevents the insect from being scared off by the user's hand and/or arm, since the handle is more distant from the capture opening. Provision can also be made of multiple carrying handles, exactly one carrying handle being preferred. In some embodiments, the receiving chamber, in particular the receiving tube, can connect the insect trap and/or the connector of a vacuum cleaner attachment to the capture opening. With the receiving chamber, in particular with the receiving tube, it is possible to ensure in particular that the insect does not fly away. In an advantageous embodiment, the receiving chamber, in particular the receiving tube, avoids the need for an approach of the entire insect capturing device. It also prevents the user's hand from being perceived, in particular if the at least one carrying handle is situated far behind the capture opening, preferably beyond the receiving chamber, particularly preferably beyond the receiving tube. Instead, when used as intended a preferably comparatively thin receiving chamber, in particular in the form of a receiving tube, approaches the insect on the surface in order to capture the insect and the rest of the insect capturing device can maintain a sufficient distance. The receiving chamber, in particular the receiving tube, preferably has a length of at least 5 cm, in particular of at least 10 cm. By means of the receiving chamber, in particular in the form of a receiving tube, insects are blinded in a particularly efficient manner. Also, the blinding cone with the at least one glare light source cannot be designed to just any width, i.e., should the bulkier components of the insect trap have to be moved directly toward the insect, then it is more difficult to produce a suitable blinding cone in a reliable manner.

In some embodiments, provision is made such that the insect trap comprises a suction device, in particular one that generates a negative pressure. The suction device is preferably configured as a suction fan. The suction device is preferably combined with a receiving tube, which then can also be called a suction tube and which preferably aspirates insects. A filter and/or collection container is preferably provided between the capture opening and the suction device, in particular the suction fan. In some embodiments, the insect trap comprises at least one filter and/or collection container through which the air drawn in by the suction device is transported. Insects can be aspirated with the suction device, in particular by means of the suction tube. In some embodiments, the receiving chamber or the receiving tube is a suction tube, which is adapted and arranged for aspirating insects. The activation switch described in this disclosure can preferably turn the suction device on.

A cage trap can also be provided in place of the suction device or in addition to the suction device. In some embodiments of the insect capturing device, the cage trap is under tension in order to kill or stun the insect. Provision can be made such that the cage trap is pretensioned so that it can spring forward. The activation switch described in this disclosure can preferably trigger this process. The combination of a cage trap with a suction device is also conceivable, wherein the air is sucked through the mesh of the cage trap in order to convey the insect into the cage trap.

It is also possible to catch insects alive, in particular if the collection container is designed as suitably soft. In one embodiment, the collection container is a collection bag, wherein the bag wall is permeable to air. In another embodiment, the collection container is a collection chamber having an inlet and an outlet, wherein the air enters the collection container via the inlet and escapes via the outlet and an outlet filter filters the air and in particular also prevents insects from escaping through the outlet.

In some embodiments, provision is preferably made such that the collection container can be opened in order to release insects. For example, a release flap or door, which permits access to the collection container, may be present. Provision can also be made of a release switch for actuating the release flap or door. The release switch can be designed as a pushbutton, toggle switch, rotary switch, sensor surface, pistol trigger or in some other way.

In some embodiments, provision is also made of an activation switch for activating the insect trap. The at least one carrying handle can comprise said activation switch. The advantage of mounting it on the at least one carrying handle is that an activation can take place once the insect capturing device has already largely approached the insect. The activation switch can be designed as a pushbutton, toggle switch, rotary switch, or in some other way. For example, a trigger as in a pistol is also conceivable, as is a sensor surface that reacts to touch. An activation switch in the sense of the present invention is a preferably mechanical element which, when activated, in particular by a human hand, activates the insect capturing device, for example by turning on a suction device, in particular a suction fan.

A light switch can also be provided for the glare light source, in particular on the at least one carrier handle. The light switch can be designed as a pushbutton, toggle switch, rotary switch, sensor surface, pistol trigger, or in some other way. It is also conceivable for the glare light source to be activated automatically or when the activation switch for the insect trap is actuated. In one embodiment, the glare light source and the suction device are preferably activated by a common activation switch.

In some embodiments, the activation switch and/or light switch described in the preceding can automatically return to a starting position. It can be, for example, a rotary or toggle switch that automatically returns to its starting position.

A light activation unit, which is activated by the suction device, can also be provided in place of or in addition to a light switch. It can be a resistance element, which is reoriented by the air flow when the air flow of the suction device is activated. The resistance element can be, for example, a wafer or a plate, which is flipped by the air flow. If the suction device is activated, the resistance element changes its orientation and in doing so activates the light activation unit, in particular by means of leverage.

The activation switch and/or light switch described in the preceding can be located on the at least one carrying handle and/or be part of the at least one carrying handle in some embodiments, as described in the preceding. It is also conceivable for the activation switch and/or light switch to be configured as a rotary switch, in particular wherein the receiving tube is rotatable and the rotary switch is actuated by turning the receiving tube. Said rotary switch preferably returns automatically to a starting position.

In some embodiments, the opening edge of the capture opening is configured such that it can be set on a level surface. The opening edge preferably has at least two opposite regions, which can simultaneously contact the level surface when the edge is set thereon. It is particularly preferred if the entire opening edge lies in one plane and/or can circumferentially contact said level surface. Provision can be made such that the lighting means is situated behind the opening in order to facilitate this.

The collection container can comprise a one-way barrier, in particular at the inlet. The one-way barrier only allows insects to pass in one direction, i.e., the insects are sucked in through the one-way barrier but then can no longer pass through the one-way barrier in the reverse direction. The one-way barrier can be a check valve, in particular one which opens automatically in the fluid flow of the suction device and closes automatically in the absence of the fluid flow, i.e., when the suction device is turned off. As a one-way barrier, it is also conceivable to use a narrow inlet which the insects cannot find, in particular if the inlet is not freely accessible. Fibers, hairs or bristles, in particular ones made of plastic, can be oriented in such a way that they can only be passed in one direction and thus form a one-way barrier.

Provision is preferably made such that the suction device, in particular the suction fan, comprises a turbo machine having, for example, rotor blades, propellers and/or fans. Air can be sucked in with the turbo machine. It is also preferred if the fluid suctioned by the mechanism, in particular the aspirated air, first passes through the collection container in order to reach said turbo machine. This prevents insects from reaching the area of the turbo machine, which in turn prevents the insects from being injured or the turbo machine from being damaged.

Provision is preferably made such that the at least one glare light source is formed by at least one, in particular exactly one LED or by a plurality of preferably interconnected LEDs or by exactly one LED or by exactly two preferably interconnected LEDs. Surprisingly, LEDs are particularly well-suited for the insect trap. Insects are usually attracted by the heat rather than by the light. Accordingly, LEDs should be less well-suited than standard light bulbs. However, it has been established that the blinding effect, as described in the preceding, definitely manifests itself with LEDs. The insects are blinded rather than attracted. The insects may also be warned by a change in the temperature if the light bulb is too hot, hence LEDs are particularly well-suited.

Provision is preferably made such that the LED emits light from the UV range. In addition, visible light may also be emitted. In one embodiment, light is emitted mostly from the UV range, in particular exclusively from the UV range.

In order to prevent the blinding cone of the glare light source from illuminating the inner wall of the receiving chamber, a lens or a lens system can be used for focusing the light beam or the LED glare light source. The glare light source, e.g., the LED, can be positioned directly at the capture opening or in particular in back of the latter in the receiving chamber, in particular in the receiving tube. Positioning a glare light source further back in the receiving tube would require a blinding cone with a steeper slope. For this embodiment of an active insect capturing device according to the invention, the glare light source can comprise a laser or be configured as a laser, wherein said laser preferably also emits light in the UV range. If a laser is used, in an expedient embodiment the glare light source and thus the entire insect capturing device can then be introduced with a greater distance to the insect and still be able to blind the latter sufficiently. As an alternative or in addition, it is also possible to position the glare light source in the form of a laser further back in the receiving chamber, in particular in the receiving tube, or to configure said receiving tube correspondingly long.

In a further embodiment of the active insect capturing device according to the invention, said device comprises at least one brightness sensor for determining the brightness in the surroundings of the insect. This brightness sensor detects artificial light indoors as well as daylight outdoors. The active insect capturing device according to the invention further comprises at least one data processing device 20 for comparing the brightness in the surroundings of the insect to the lighting intensity of the glare of the glare light source or to the adjustable lighting intensities of the glare light source. To this end, the active insect capturing device according to the invention further comprises at least one control unit for adjusting the lighting intensity of the glare light source in the form of, for example, a regulator or a switch. The lighting intensity of the glare light source can thus be turned down during storms or at dusk (in other words, rather dark surroundings) compared to, for example, very bright artificial light or sunshine. The glare light source is thus only as bright as necessary in order to achieve a sufficient blinding effect or adjust it in comparison to the brightness of the environment, which saves energy costs and prolongs the service life of the glare light source. In an expedient embodiment, the lighting intensity of the glare light source or the adjustable lighting intensities of the glare light source can be stored as a reference value/reference values in the data processing device 20.

In a further embodiment, provision is made such that the at least one data processing device 20 determines a capture probability on the basis of the comparison of the determined brightness in the surroundings of the insect to the lighting intensity of the glare light source or to the adjustable lighting intensities of the glare light source. In an expedient embodiment, the at least one data processing 20 device is connected to or connectable to or equipped with an indicator device 100, in particular a display or output device, which displays the probability of capturing the insect or whether an active capturing of the insect is possible or likely. If the difference between the brightness in the surroundings of the insect and the lighting intensity of the glare light source is too small, the insect will not be sufficiently blinded and the insect will therefore perceive the capture opening and react with a flight instinct. If the difference between the brightness in the surroundings of the insect and the lighting intensity of the glare light source is sufficient, the insect will be sufficiently blinded, the flight instinct will be suppressed, and the insect can be captured without any problem. The indicator device 100 can be configured as, for example, a "yes/no" system or as a traffic light system, in particular using a green, yellow and red LED indicator.

In some embodiments, the at least one glare light source is located inside the receiving chamber.

Provision is preferably made of a centering bracket, which positions the at least one glare light source at the capture opening, in particular in such a way that the glare shines from the direction of the capture opening and/or of the opening edge and/or through the capture opening and/or in such a way that an object in front of the capture opening is directly illuminated by the glare light source.

The centering bracket can be an in particular oblong bracket to which the glare light source is fastened. The centering bracket can preferably be formed by a bar, which in particular extends rearward away from the capture opening. Also conceivable is a crossbar to which the glare light source is fastened, the crossbar being connected to the opening edge and/or to the at least one chamber wall. However, it is particularly preferred if the centering bracket extends, starting from the glare light source, rearward away from the capture opening. This is particularly effective in preventing the shadow of the centering bracket from being perceived by an insect. The centering bracket can also be formed wholly or in part from a transparent or translucent material.

There can also be one or multiple glare light sources, which are situated at a distance from the opening edge, in particular in the center or near the center of the capture opening. Such glare light sources can also be called central glare light sources. Said at least one central glare light source is preferably situated no further than 2 cm away from the center of the capture opening. Said at least one central glare light source is preferably situated no more than 20%, in particular 10% of the mean opening diameter of the capture opening away from the center of the capture opening.

In some embodiments, the at least one glare light source is preferably formed by an annular glare light source surrounding the capture opening or by multiple glare light sources arranged circumferentially around the capture opening. The glare light sources can preferably be fastened to the opening edge and/or to the at least one chamber wall. They can preferably also be integrated in the opening edge and/or in the at least one chamber wall.

An energy generating device, with which the at least one glare light source is supplied with energy, is included in some embodiments.

The energy generating device can be a solar cell. For example, it can be a solar cell on the at least one carrying handle or on the receiving tube. It preferably involves light, which is emitted by the sun, by indoor lighting or by a vacuum cleaner.

However, it can also be an energy generating machine comprising in particular a turbine and/or a generator, which converts the internal energy released by a flowing fluid, in particular of the air aspirated by a vacuum cleaner, into electrical energy. To do so, the energy generating machine preferably uses the internal energy of the air flowing through the capture opening. These embodiments have proven themselves, especially in the case of vacuum cleaner attachments. Preferably, the vacuum cleaner attachment then does not have to be supplied with energy separately, but instead supplies the at least one glare light source itself with the generated energy. This can be combined with a battery.

Included in some embodiments is an energy storage unit, in particular a battery, with which the at least one glare light source is supplied with energy. This can be an energy storage unit having at least one primary cell or having at least one secondary cell, the latter being preferred. The energy storage unit is preferably a rechargeable battery, in particular having one or multiple secondary cells. As a result, the apparatus is particularly well-suited for portable use (although there are also portable hand-held apparatuses that connect to the power grid). In the case of passive insect capturing devices, a battery for operation is generally not considered because insects are attracted through the continuous use and the amount of energy in a battery is typically not suited for continuous use.

The at least one glare light source is preferably configured as a spotlight, in particular one that shines through the capture opening or away from the opening edge. A particularly efficient blinding of insects is thus achieved. In this case, the glare light can also be called a floodlight. The light is preferably focused by reflectors toward the capture opening and/or on a region in front of the capture opening.

In some embodiments, provision is made such that the at least one glare light source can shine glare light into the at least one chamber wall, which light is then emitted at the circumferential opening edge. Provision can also be made such that the at least one chamber wall comprises a light-conducting material, preferably fiber-optic cables, for this purpose.

In one embodiments, the at least one glare light source is situated behind the plane of the capture opening, in particular positioned behind the plane of the capture opening by the centering bracket. In principle, it is also possible for the glare light source to be located in the plane or in front of the plane of the capture opening. The plane of the capture opening is defined by the contour of the opening edge. The opening edge preferably lies in one plane. If this is not the case, the position of the plane is averaged so that the points of the opening edge have on average the smallest possible distance from the plane. If the glare light source is located behind the plane of the capture opening, the opening edge can be set on a surface without the risk of the glare light source being damaged and/or of the insect being injured by the glare light source. In expedient embodiments, the glare light source is located up to 200 cm, preferably up to 5 cm, with preference given to 0.01 to 3 cm, with particular preference given to 0.1 to 2 cm and in particular 0.5 to 1 cm behind the plane of the capture opening. These distances have proven to be particularly suitable. If the distance becomes greater, in particular greater than 5 cm, i.e., the glare light source is shifted even further back, the risk of the blinding cone being excessively shielded by the opening edge of the capture opening is increased. This risk is also increased in particular if use is made of a thin receiving tube and the user's hand trembles. At distances greater than 5 cm and up to 200 cm, it has proven to be very advantageous to use glare light sources that are equipped with a lens or a lens system or a laser glare light source. In particular when high-intensity LED glare light sources or lasers are used as glare light sources, the vacuum cleaner tube of a standard floor vacuum cleaner, for example, can also be used as a receiving chamber.

The at least one glare light source can be formed by a plurality of circumferential glare light sources, in particular LEDs. Each of the LEDs is thus a glare light source which is connected to other glare light sources. Three, four, five or even more glare light sources are possible. It is also conceivable for the at least one glare light source to be configured as a continuous circumferential ring, for example by a continuous OLED material. An annular arrangement of the glare light sources is also achievable by, for example, a plurality of annularly arranged LEDs. "Annular" is understood to mean any closed track, in particular one surrounding the capture opening, wherein said track can be, for example, circular or oval, or also rectangular. Circular or oval arrangements have proven to be particularly suitable. In one embodiment, 3 to 10 glare light sources, in particular LEDs, are arranged annularly. The plurality of glare light sources can be integrated in the opening edge or fastened thereto.

In some embodiments, the glare light source, in particular comprising LEDs, emits visible light, in other words light comprising wavelengths between 380 and 780 mm. However, provision can also be made such that the glare light source alternatively or additionally comprises light in the ultraviolet, for example from 100 to 380 nm, and/or in the infrared wavelength range. Glare light sources which emit wavelengths in the range of 100 to 400 nm, in particular 250 to 380 nm, with particular preference given to 300 to 350 nm, have proven to be particularly suitable. In an expedient embodiment, provision can also be made such that the glare light source emits light mostly in the range of 100 to 500 nm, in particular 200 to 450 nm, preferably wherein at least 50%, in particular 60%, with particular preference given to 80%, of the photons emitted by the glare light source have an energy corresponding to one of the aforementioned wavelength ranges. In one embodiment, provision can be made such that the fraction of visible light is less than 50%.

In a further embodiment, the invention not only relates to the vacuum cleaner attachment, but also to a kit comprising the insect capturing device according to the invention described in this disclosure in the form of a vacuum cleaner attachment and a vacuum cleaner, which can be connected to the vacuum cleaner attachment, in particular wherein the insect capturing device is fastened to an end of a vacuum cleaner tube of the vacuum cleaner.

The present invention also relates to a method for capturing insects with an insect capturing device, in particular with the active insect capturing device according to the invention described above, comprising at least one glare light source and an insect trap, the method having the following steps:

1) Locating an insect on a surface,
2) Blinding the insect with the at least one glare light source,
3) Moving the insect capturing device closer to the blinded insect,
4) Capturing the insect with the insect trap.

The activation of the insect trap, for example of the suction device of an insect trap, can not only take place in step 4), but also in step 1), 2) or 3). However, provision is preferably made such that the activation of the insect trap takes place before step 2) or during step 2). This prevents the insect from being startled by the activation itself. Also conceivable in principle is a later activation, for example in step 4), wherein the insect is already in the effective area of the trap when the activation occurs. However, it has been shown that many times an early activation is expedient. Surprisingly, the insects are not scared off by, for example, an activated suction device of the insect trap. It has been observed that insects often hold fast to a surface in the event of an air draft. Without being bound to a single theory, this could be explained by the fact that wind gusts in nature constitute a danger of these insects being hurled into ponds with fish or into spiderwebs. This may have led to an adaptation to the effect that at least some insects hold fast if a suction device approaches and if they are blinded. Possibly in an evolutionary sense—and from the insect's point of view—the suction device corresponds to a wind gust and the glare light source to the sun. Although this theory may not be correct, the method has nevertheless proven to be successful for capturing insects.

Particular preference is given to a method in which insects on a surface are caught in a "contactless" manner, in other words there is no contact between the surface and the insect capturing device. When catching the insect, the insect capturing device according to the invention does not have to be set on the surface. Instead, it is possible to aspirate from a certain distance. This is advantageous if the insects are on uneven surfaces or even delicate surfaces such as rounded glass surfaces, plants, foods or the like. As already described, an active movement of the insects during the capture process is not required in this case either. Even if the insects hold fast, they can generally be aspirated without any problem owing to the blinding light effect generated and the flight instinct suppressed with the insect capturing device according to the invention.

In order to capture the insects more effectively, in some embodiments of the method according to the invention for capturing insects with an insect capturing device according to the invention it is also advantageous to minimize the immobility (for example by holding fast) of the insects shortly before aspiration, in particular by retriggering a flight reflex shortly before aspiration. To do so, the insect is blinded with the at least one glare light source via the emitted blinding cone, wherein the user moves the insect capturing device closer during the blinding of the insect. A flight reflex can be triggered as soon as the receiving tube is positioned just above the insect, wherein the blinding cone is still focused on the insect, in particular on the head of the insect. On one hand it is possible to shift the blinding cone, in particular if the mean diameter thereof is smaller than the capture opening, in such a way that it is now focused next to the insect rather on the head of the insect. Owing to the no longer present blinding effect and the "sudden" appearance of a cone of light in the immediate surroundings, a flight reflex of the insect is triggered. The insect no longer holds fast to the surface and instead pushes itself away from it with a "jump" before taking flight. The insect can then be aspirated as it jumps up. In addition, it is possible to nudge the insect with the edge or with the inside of the suction tube, in particular from the side moving toward the insect. During this process, the insect can, but does not have to, remain inside the blinding cone. A flight reflex can also be triggered by the physical contact and possibly the sudden appearance of the lateral shadow caused by the suction tube, which now moves into the insect's field of vision. In this case also, the insect initially reacts by "jumping away" and the insect can then be aspirated.

In another embodiment of the method according to the invention for capturing insects with an insect capturing device, in particular with the active insect capturing device according to the invention described above, said method further comprises the steps:

a) Determination of the brightness in the surroundings of the insect,
b) Comparison of the determined brightness in the surroundings of the insect to the lighting intensity of the glare light source or to the adjustable lighting intensities of the glare light source,
c) Determination of a capture probability on the basis of the comparison carried out according to b),
d) Display of a capture probability.

These steps preferably take place between the location of an insect on a surface (step 1) and the blinding of the insect with the at least one glare light source (step 2).

The present invention further relates to the use of an insect capturing device, in particular as described above, comprising at least one glare light source for actively capturing insects, in particular wherein the insects, before being caught, are irradiated directly with a glare light source. The present invention also relates to the use of the insect capturing device as described above for catching insects by means of a vacuum cleaner on which said insect capturing device is mounted, preferably on the vacuum cleaner tube thereof on which said insect capturing device is mounted.

With the present invention, it has been surprisingly confirmed that it is possible to construct active insect capturing devices capable of collecting insects without requiring particularly high levels of quickness and dexterity. It was also surprisingly shown that active cooperation in the form of active movement on the part of the insect and setting the insect capturing device directly on a surface on which the insect is located are not necessary. The insect capturing device is suited for house flies, blow flies, fruit flies and other insects. The principle is not entirely unknown in comparable form from some mammals, for example deer which freeze in the glare of the headlights of a car, the consequence of a car accident being undesired in that case. Even if the insects jump and/or fly away at the last moment, in doing so they usually approach the capture opening first, hence the danger of entering the effective zone of the trap is increased even further. Also, it often seems to be instinctive to flee in the direction of the light source, as the latter may indicate a supposed way out of the trap. Ultimately, insects could be caught and/or killed with surprising success with the present invention.

Further features and advantages of the invention emerge from the following description, in which exemplary embodiments of the invention are explained by way of example with reference to schematic drawings, without limiting the invention.

Therein:

Figure 1:
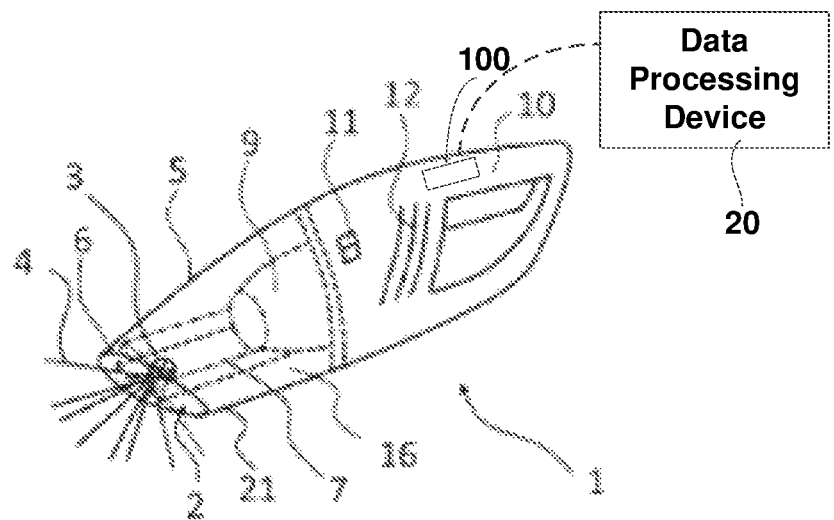
FIG. 1 shows a perspective view of an embodiment of the active insect capturing device comprising a suction device.

FIG. 1 shows the perspective view of an embodiment of the active insect capturing device 1 comprising a capture opening 2 having an opening edge 6, at least one receiving chamber 21 having an interior 16 having at least one chamber wall 5, at least one glare light source 3 and an insect trap 9 in the form of a suction device, wherein the insect capturing device comprises a carrying handle 10 and is portable. The chamber wall 5 comprises the opening edge 6, which delimits the capture opening 2. The at least one glare light source 3 emits the glare light 4 in the direction of the capture opening 2. Venting slits 12 expel the air that was sucked in by the suction device. The suction device can be turned on and off with the activation switch 11. The at least one glare light source 3 is positioned in the center area of the capture opening 2 by a centering bracket 7. The interior 16 is provided between the capture opening 2 and the insect trap 9 in the form of a suction device. The carrying handle 10 is also located beyond the receiving chamber 21 and on a side of the receiving chamber 21 opposite the capture opening 2.

Figure 2:
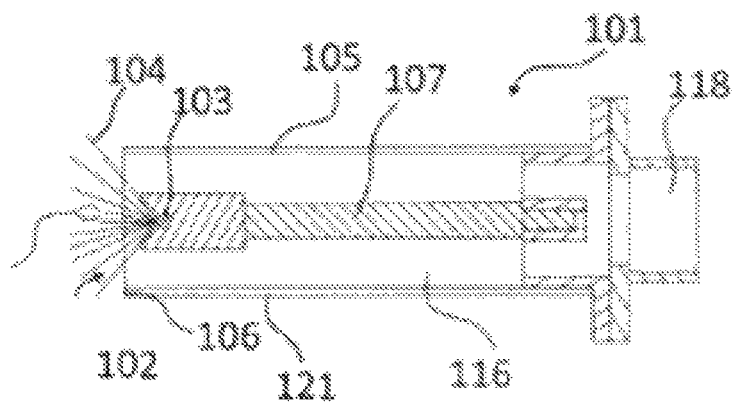
FIG. 2 shows a schematic cross-sectional view of a further embodiment of the active insect capturing device in the form of a vacuum cleaner attachment.

FIG. 2 shows the schematic cross-sectional view of a further embodiment of the active insect capturing device 101 comprising a capture opening 102 having an opening edge 106, at least one receiving chamber 121 having at least one chamber wall 105, and at least one glare light source 103. An insect trap is not shown, since the device is an active insect capturing device 101 in the form of a vacuum cleaner attachment, and the vacuum cleaner can optionally form an insect trap. Vacuum cleaners typically comprise a suction device, which generates a negative pressure. The at least one glare light source 103 is positioned in the center area of the capture opening 102 by means of a centering bracket 107 in the form of a bar. The at least one glare light source 103 emits the glare light 104 in the direction of the capture opening 102 so that the insect X can be blinded. The insect capturing device 101 in the form of a vacuum cleaner attachment comprises a connector 118 for attaching a vacuum cleaner tube. The interior 116 of the receiving chamber 121 is provided between the capture opening 102 and the connector 118.

Figure 3:
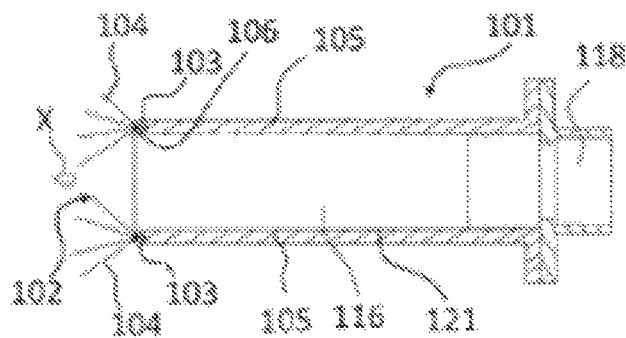
FIG. 3 shows a schematic cross-sectional view of a further embodiment of the active insect capturing device in the form of a vacuum cleaner attachment.

FIG. 3 shows the schematic cross-sectional view of a further embodiment of the active insect capturing device 101 comprising a capture opening 102 having an opening edge 106, at least one receiving chamber 121 having at least one chamber wall 105, and at least one glare light source 103. In this embodiment, the at least one glare light source 103 is in the form of an LED halo ring, which surrounds the capture opening 102. The LEDs are integrated in the opening edge 106 of the chamber wall 105 of the receiving chamber 121. An insect trap is not shown, since the device is an active insect capturing device 101 in the form of a vacuum cleaner attachment. The at least one glare light source 103 emits the glare light 104 from the opening edge 106 of the capture opening 102 so that the insect X can be blinded. The insect capturing device 101 in the form of a vacuum cleaner attachment comprises a connector 118 for attaching a vacuum cleaner tube. The interior 116 of the receiving chamber 121 is provided between the capture opening 102 and the connector 118.

Figure 4:
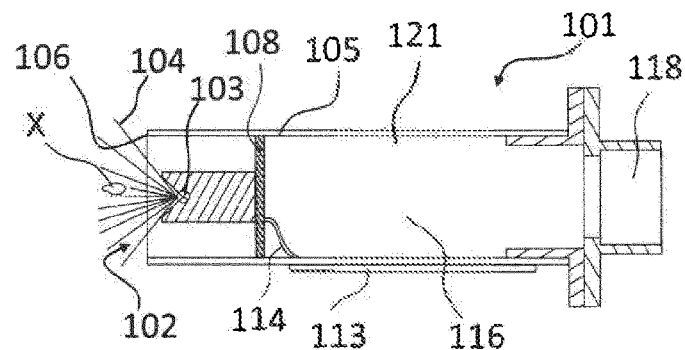
FIG. 4 shows a schematic cross-sectional view of a further embodiment of the active insect capturing device in the form of a vacuum cleaner attachment.

FIG. 4 shows the schematic cross-sectional view of a further embodiment of the active insect capturing device 101 comprising a capture opening 102 having an opening edge 106, at least one receiving chamber 121 having at least one chamber wall 105, and at least one glare light source 103. An insect trap is not shown, since the device is an active insect trapping device 101 in the form of a vacuum cleaner attachment, wherein the associated vacuum cleaner can form the actual trap for insects. The at least one glare light source 103 is positioned in the center area of the capture opening 102 by means of a centering bracket in the form of a crossbar 108. The at least one glare light source 103 emits the glare light 104 in the direction of the capture opening 102 so that the insect X can be blinded. The insect capturing device 101 in the form of a vacuum cleaner attachment comprises a connector 118 for attaching a vacuum cleaner tube. The interior 116 is provided between the capture opening 102 and the connector 118. The at least one glare light source 103 is supplied with current via a cable 114 from a solar cell 113.

Figure 5:
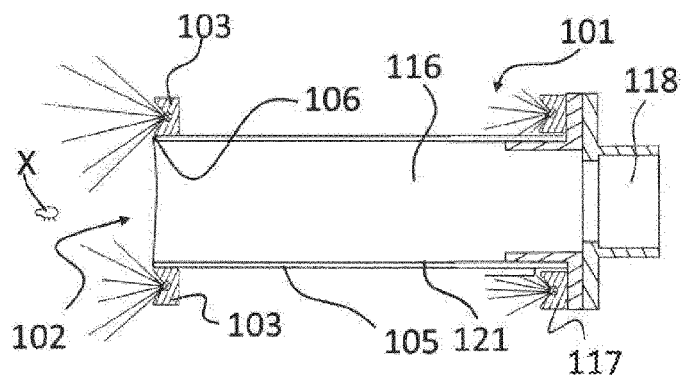
FIG. 5 shows a schematic cross-sectional view of a further embodiment of the active insect capturing device in the form of a vacuum cleaner attachment.

FIG. 5 shows the schematic cross-sectional view of a further embodiment of the active insect capturing device 101 comprising a capture opening 102 having an opening edge 106, and at least one glare light source 103. In this embodiment, the at least one glare light source 103 is in the form of an LED halo ring, which surrounds the capture opening 102 and is fastened on the outside to the chamber wall 105 or the opening edge 106. An insect trap is not shown, since the device is an active insect trapping device 101 in the form of a vacuum cleaner attachment. The at least one glare light source 103 emits the glare light 104 from the opening edge 106 of the capture opening 102 so that the insect X can be blinded. The insect capturing device 101 in the form of a vacuum cleaner attachment comprises a connector 118 for attaching a vacuum cleaner tube. The interior 116 of the receiving chamber 121 is provided between the capture opening 102 and the connector 118. Optionally, provision can be made of secondary glare light sources 117, which hide other areas of the insect capturing device 101 by means of a glare.

Figure 6:
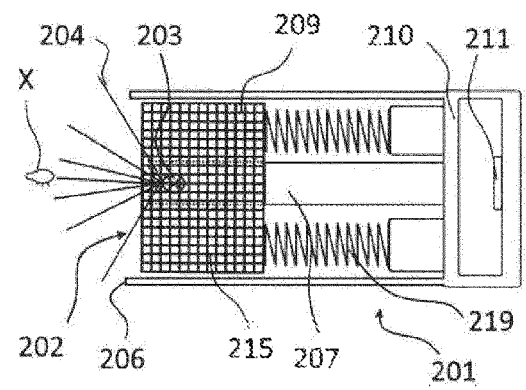
FIG. 6 shows a schematic cross-sectional view of a further embodiment of the active insect capturing device comprising a cage trap.

FIG. 6 shows the schematic cross-sectional view of a further embodiment of the active insect capturing device 201 comprising a capture opening 202 having an opening edge 206 and at least one glare light source 203. In this embodiment, the insect trap 209 comprises a cage trap 215 and the springs 219. The cage trap 215 can spring forth from its original position in order to capture an insect. A carrying handle 210 is provided with an activation switch 211 for this purpose. The cage trap 215 is shown in a pretensioned position, in which the springs 219 are compressed. Upon actuation of the activation switch 211, the cage trap 215 is disengaged and the springs 219 relax, pushing the cage trap 215 forward. It then pops out via the opening edge 206 in order to capture an insect X, which was blinded by the glare 204 of the at least one glare light source 203. The at least one glare light source 203 is positioned in the center area of the capture opening 202 by means of a centering bracket 207 in the form of a rod. The cage trap can be electrically charged in order to kill the insect. The cage trap is located in a receiving chamber.

Figure 7:
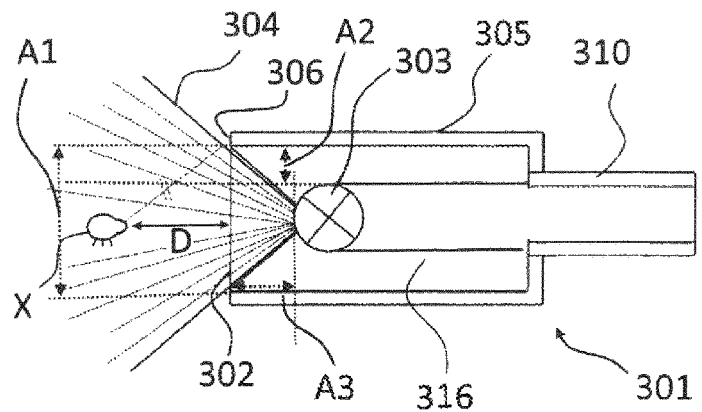
FIG. 7 shows a schematic sketch of a further embodiment of the active insect capturing device.

FIG. 7 is a schematic sketch of an embodiment in the sense of the present invention. The insect X is situated at a distance D from the capture opening 302 defined by the opening edge 306. The glare light 304 forms a blinding cone, by which the insect is blinded and is thus unable to perceive the opening edge 306. Consequently, the insect does not move away when the insect capturing device 301 is moved toward it. During this process, the user can hold the insect capturing device by the carrying handle 310. The clearance A1 is thus the inner diameter of the interior 316. The distance A2 is the distance between the at least one glare light source 303 and the chamber wall 305. The distance A2 is suitable for the passage of insects. A3 is the distance between the opening edge 306 and the glare light source 303. In this case it is preferred if this distance is at least 0.5 cm.

Figure 8:
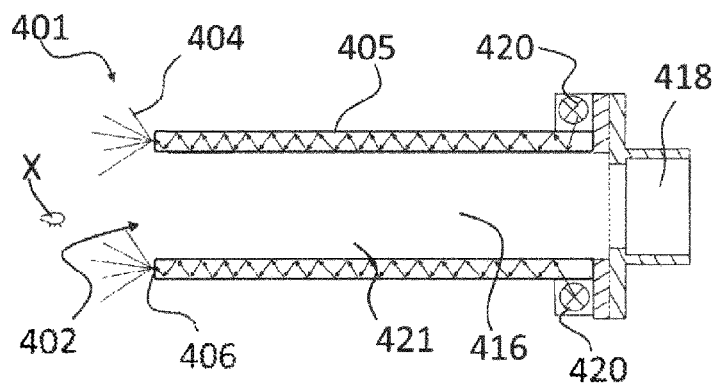
FIG. 8 shows a schematic cross-sectional view of a further embodiment of the active insect capturing device in the form of a vacuum cleaner attachment.

FIG. 8 shows the schematic cross-sectional view of a further embodiment of the active insect capturing device 401 comprising a capture opening 402 and at least one glare light source 420. The at least one glare light source 420 shines glare light 404 into the chamber wall 405, which is then emitted at the circumferential opening edge 406. The receiving chamber 421 in the form of a receiving tube having the interior 416 is provided between the capture opening 402 and the connector 418. The receiving chamber 421, in particular the receiving tube, comprises a light-conducting material, for example fiber-optic cables. The at least one glare light source 420 shines light into this light-conducting material in such a way that it exits at the circumferential opening edge 406. The at least one glare light source 420 can be formed by multiple point-source LEDs. This embodiment has the advantage of ensuring in particular that the opening edge 406 does not cast any shadows.

Figure 9:
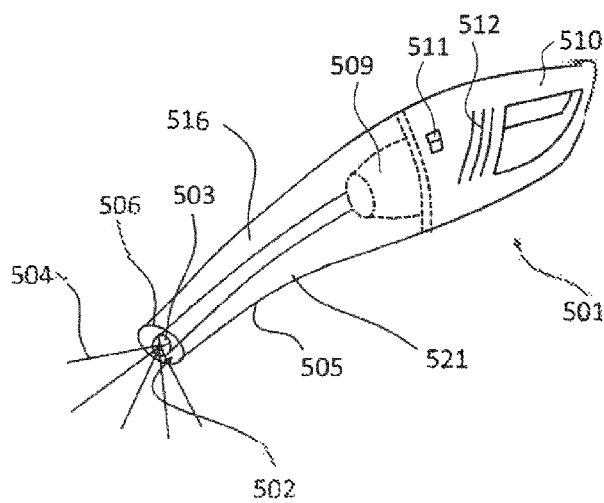
FIG. 9 shows a perspective view of a further embodiment of the active insect capturing device comprising a suction device.

FIG. 9 shows the perspective view of a further embodiment of the active insect capturing device 501 comprising a capture opening 502 having an opening edge 506, at least one receiving chamber 521 having at least one chamber wall 505, at least one glare light source 503 and an insect trap 509 in the form of a suction device, wherein the insect capturing device comprises a carrying handle 510 and is portable. The chamber wall 505 comprises an opening edge 506, which delimits the capture opening 502. The at least one glare light source 503 emits the glare light 504 in the direction of the capture opening 502. Venting slits 512 expel the air that was sucked in by the suction device. The suction device can be turned on and off with the activation switch 511. The embodiment of FIG. 9 differs from the embodiment of FIG. 1 mainly in that the receiving chamber, in particular the receiving tube 521 and the interior 516, are longer than in FIG. 1.

The features of the invention disclosed in the preceding description, in the claims and in the drawings may be essential for the realization of the invention in its various embodiments both individually and in any combination.

What is claimed is:

1. An active insect capturing device comprising:
   a capture opening having one opening edge, at least one glare light source, and at least one receiving chamber having at least one chamber wall,
   at least one brightness sensor for determining the brightness in the surroundings of the insect,
   at least one data processing device arranged and adapted for comparing the brightness in the surroundings of the insect determined with the at least one brightness sensor to a lighting intensity of the glare light source or to adjustable lighting intensities of the glare light source,
   at least one control unit for adjusting the lighting intensity of the glare light source, and
   an indicator or output device,
   wherein the at least one data processing device is arranged and adapted to determine a probability of capturing the insect based on the comparison of the brightness in the surroundings of the insect to the lighting intensity of the glare light of the glare light source, wherein the data processing device is connected or connectable to the indicator device or to the output device, which are adapted and arranged to indicate or output, respectively, the capture probability;
   wherein the active insect capturing device is a vacuum cleaner attachment for a vacuum cleaner.

2. The active insect capturing device according to claim 1, wherein the at least one glare light source is adapted and arranged for directly illuminating a zone in front of the capture opening, or wherein the at least one chamber wall or the opening edge are/is transparent or translucent, or wherein the receiving chamber is a receiving tube and the capture opening is formed on one end of the receiving tube.

3. The active insect capturing device according to claim 1, wherein the insect trap comprises a suction device which generates a negative pressure.

4. The active insect capturing device according to claim 3, wherein said device comprises at least one filter and/or collection container through which air aspirated by the suction device is transported.

5. The active insect capturing device according to claim 1, wherein the at least one glare light source is formed by at least one LED or by a plurality of interconnected LEDs, emitting light in the UV range.

6. The active insect capturing device according to claim 1, wherein the at least one glare light source is formed by or comprises a laser emitting light in the UV range.

7. The active insect capturing device according to claim 1, wherein the at least one glare light source shines directly through the capture opening and/or that the glare light source is located behind the capture opening and/or in the receiving chamber.

8. The active insect capturing device according to claim 1, further comprising an energy generating device and/or an energy storage unit with which the at least one glare light source is supplied with energy.

9. A kit comprising:
   an active insect capturing device according to claim 1, wherein the active insect capturing device is a removable vacuum cleaner attachment for a vacuum cleaner; and
   a vacuum cleaner, wherein the insect capturing device is fastenable to an end of a vacuum cleaner tube.

10. The kit according to claim 9, wherein the vacuum cleaner has at least one carrying handle and is portable.

11. A method for capturing insects with an insect capturing device, comprising:
    a capture opening having an opening edge,
    at least one glare light source,
    an insect trap and
    at least one receiving chamber having at least one chamber wall,
    the method having the following steps:
    1) locating an insect on a surface,
    2) blinding the insect with the at least one glare light source,
    3) moving the insect capturing device closer to the blinded insect,
    4) capturing the insect with the insect trap,
    further comprising between steps 1) and 2), the following steps:

a) determination of the brightness in the surroundings of the insect by use of a brightness sensor;
b) comparison of the determined brightness in the surroundings of the insect to the lighting intensity of the glare light source by use of a data processing device;
c) determination of a capture probability on the basis of the comparison performed according to b) by use of a data processing device; and
d) display or output of the determined capture probability by use of an indicator or output device.

12. The method according to claim 11, wherein the capturing of the insect does not require setting the insect capturing device on the surface.

13. The method according to claim 11 wherein a flight reflex of the insect is triggered between steps 3) and 4) by nudging the insect with a receiving tube and/or by removing a blinding cone.

14. An active insect capturing device comprising:

a capture opening having an opening edge, at least one glare light source, an insect trap and at least one receiving chamber having at least one chamber wall;

at least one brightness sensor for determining the brightness in the surroundings of the insect;

at least one data processing device arranged and adapted for comparing the brightness in the surroundings of the insect determined with the at least one brightness sensor to a lighting intensity of the glare light source or to adjustable lighting intensities of the glare light source, and at least one control unit for adjusting the lighting intensity of the glare light source;

and an indicator or output device;

wherein the at least one data processing device is arranged and adapted to determine a probability of capturing the insect based on the comparison of the brightness in the surroundings of the insect to the lighting intensity of the glare light of the glare light source, wherein the data processing device is connected or connectable to the indicator device or to the output device, which are adapted and arranged to indicate or output, respectively, the capture probability.

* * * * *

UNITED STATES PATENT AND TRADEMARK OFFICE
CERTIFICATE OF CORRECTION

| | | |
|---|---|---|
| PATENT NO. | : 11,864,550 B2 | |
| APPLICATION NO. | : 17/284358 | |
| DATED | : January 9, 2024 | |
| INVENTOR(S) | : Thomas Webert | |

It is certified that error appears in the above-identified patent and that said Letters Patent is hereby corrected as shown below:

On the Title Page

Under item (57) Abstract; Line 1, delete "insert" and insert --insect--.

Signed and Sealed this
Twenty-seventh Day of February, 2024

Katherine Kelly Vidal
*Director of the United States Patent and Trademark Office*